US012616294B2

(12) United States Patent
Schwager et al.

(10) Patent No.: US 12,616,294 B2
(45) Date of Patent: May 5, 2026

(54) COMPONENT OF A CARRIER SYSTEM

(71) Applicant: Lindnerhof-Taktik GmbH, Lenggries (DE)

(72) Inventors: Martin Schwager, Penzberg (DE); Josef Sixt, Lenggries (DE)

(73) Assignee: LINDNERHOF-TAKTIK GMBH, Lenggries (DE)

( * ) Notice: Subject to any disclaimer, the term of this patent is extended or adjusted under 35 U.S.C. 154(b) by 394 days.

(21) Appl. No.: 18/073,455

(22) Filed: Dec. 1, 2022

(65) Prior Publication Data

US 2023/0165360 A1 Jun. 1, 2023

(30) Foreign Application Priority Data

Dec. 1, 2021 (DE) ..................... 10 2021 131 697.9

(51) Int. Cl.
| | |
|---|---|
| *A45F 3/14* | (2006.01) |
| *B29C 45/14* | (2006.01) |
| *B29L 31/00* | (2006.01) |

(52) U.S. Cl.
CPC .......... *A45F 3/14* (2013.01); *B29C 45/14262* (2013.01); *A45F 2003/142* (2013.01); *B29L 2031/7276* (2013.01)

(58) Field of Classification Search
CPC . A45F 3/14; A45F 2003/142; B29L 2031/727
See application file for complete search history.

(56) References Cited

U.S. PATENT DOCUMENTS

| | | | |
|---|---|---|---|
| 5,724,707 A | 3/1998 | Kirk et al. | |
| 5,945,053 A | 8/1999 | Hettinga | |
| 7,240,404 B2 * | 7/2007 | Flossner | A41D 13/0012 224/675 |
| 9,114,294 B2 | 8/2015 | Clausen et al. | |
| 2005/0273985 A1 * | 12/2005 | Tsai | A44B 11/04 24/302 |
| 2007/0158380 A1 * | 7/2007 | Calkin | A41D 13/0012 224/675 |
| 2008/0257922 A1 * | 10/2008 | Cragg | A45F 5/02 224/269 |
| 2014/0304946 A1 | 10/2014 | Svatos et al. | |
| 2017/0311704 A1 | 11/2017 | Geller | |
| 2018/0132555 A1 * | 5/2018 | Gonzalez | A41D 13/01 |
| 2020/0154864 A1 * | 5/2020 | Noble | A45F 3/14 |

FOREIGN PATENT DOCUMENTS

| | | |
|---|---|---|
| DE | 6909170 U | 8/1969 |
| DE | 4338373 A1 | 5/1995 |
| DE | 19910309 A1 | 9/1999 |
| EP | 2326579 B1 | 5/2012 |
| WO | 2008015178 A1 | 2/2008 |

* cited by examiner

*Primary Examiner* — Derek J Battisti
(74) *Attorney, Agent, or Firm* — McCoy Russell LLP

(57) ABSTRACT

The present disclosure discloses a component of a carrier system comprising a belt element which is fastened to the component by a first end and comprises a second free end, by means of which it can be threaded through at least one loop of a second component, in order to fasten the components to one another, wherein the belt element comprises a textile belt strap and a plastics element. In this case, the plastics element is moulded onto the belt strap.

16 Claims, 7 Drawing Sheets

COMPONENT OF A CARRIER SYSTEM

CROSS-REFERENCE TO RELATED APPLICATION

The present application claims priority to German Patent Application No. 10 2021 131 697.9 filed on Dec. 1, 2021. The entire contents of the above-listed application are hereby incorporated by reference for all purposes.

TECHNICAL FIELD

The present disclosure relates to a component of a carrier system comprising a belt element which is fastened to the component by a first end and comprises a second free end, by means of which it can be threaded through at least one loop of a second component, in order to fasten the components to one another.

In particular, it can be a component of a carrier system by means of which bags, ammunition or weapons carriers, or similar components, can be flexibly attached to a platform. The platform can be provided for example on a bag, a backpack, a vest, or a plate carrier, and comprises at least one loop, to which the component of the carrier system can be fastened via a belt element.

BACKGROUND

Carrier systems are known. For example, these may be PALS components of a MOLLE system, as is used by the US army. In the case of this system, belt straps, extending in parallel with one another, are sewn onto the two components to be interconnected, in such a way that openings/loops that are continuous in the transverse direction are formed. These are woven together by a belt strap extending transversely to the extension of the loop, which belt strap is in each case threaded through the belt straps extending in parallel. PALS components of a MOLLE system are described for example in U.S. Pat. No. 5,724,707 A. Instead of the horizontal belt straps, slits made in a material layer are sometimes also used.

In this case, the transversely extending belt straps can typically be sewn to one component, at one side, in particular its top side, and then pushed, by the main part thereof, through the parallel belt straps, and can be pushed by their free end into a pocket arranged on the other component, in particular on the lower end thereof. The insertion of the free end into the pocket thus locks the connection. In order to be able to pull the free end out of the pocket again, another narrower strap is typically attached thereto, which narrower strap shows out of the pocket. Alternatively, press connection and/or a snap connection is used for fixing the free end of the transversely extending strap.

In order to be able to better thread the transversely extending belt strap through the loops, it is known to reinforce this by means of plastics elements, which are sewn onto the belt element. The strap for pulling out the free end is typically manufactured as a separate, narrower strap which is sewn to the free end of the belt strap. It is likewise known, instead of the belt strap, to use an element formed entirely of plastics material.

Straps overmoulded with plastics material, and fibre-reinforced hinges, are known from other fields of technology, for example from the documents DE6909170U, DE19910309A1, U.S. Pat. No. 5,945,053A, DE4338373A1, EP2326579B1, WO2008015178A1 and US20140304946A1.

SUMMARY OF EMBODIMENTS

The object of the present disclosure is that of providing an improved component of a carrier system, and an improved belt element.

The present disclosure comprises a component of a carrier system comprising a belt element which is fastened to the component by a first end and comprises a second free end, by means of which it can be threaded through at least one loop of a second component, in order to fasten the components to one another, wherein the belt element comprises a textile belt strap and a plastics element. According to the disclosure, it is provided that the plastics element is moulded onto the belt strap.

The advantage of the disclosure is firstly that the outlay for producing the belt elements, which hitherto had to be manufactured individually by sewing the corresponding components, can be reduced. Since said belt elements are usually used in identical form in large numbers, this results in a significant advantage. Furthermore, the reliability and handling ability of the belt element is increased.

The textile belt strap may be formed by webbing.

According to a possible embodiment of the present disclosure, the belt element comprises at least one, and optionally two, hinge regions, which connect regions of the plastics element adjoining said hinge regions, and in which the belt strap can be turned, in particular turned about 180°.

The hinge regions make it possible to turn or fold the belt element at defined points suitable for the fastening to the other component. They therefore facilitate the handling and increase the reliability during use.

According to a possible embodiment of the present disclosure, the hinge regions are provided by the belt strap, via which mutually separated regions of the plastics elements are connected.

According to an embodiment of the present disclosure, however, the plastics element in each case comprises, in the hinge region(s), at least one plastics region forming a film hinge. As a result, the stability of the belt element in the hinge region is increased, and furthermore a purposeful folding-down movement about an axis defined by the film hinge is made possible. In this embodiment, the belt strap can have a securing function in the event of the plastics film hinge failing.

According to a possible embodiment of the present disclosure, the film hinge or hinges therefore in each case interconnect two regions of the plastics element, which can be turned onto one another via the film hinge.

According to a possible embodiment of the present disclosure, the plastics region forming a film hinge interconnects plastics regions of the plastics element, in which the plastics element is of a greater material thickness than in the plastics region forming the film hinge.

According to a possible embodiment of the present disclosure, the belt strap is overmoulded by the plastics element in the plastics regions having a greater material thickness.

According to a possible embodiment of the present disclosure, the belt strap also interconnects two regions of the plastics element in each case, in the hinge region. This increases the stability and secures the fastening of the component for the event of the plastics film hinge failing.

According to a possible embodiment of the present disclosure, the plastics element is wider than the belt strap. For example, the width of the plastics element can be at least 1.3 times the width of the belt strap, optionally at least 1.8 times the width of the belt element. The width of the plastics element is optionally less than 3 times the width of the belt strap.

According to a possible embodiment of the present disclosure, the belt strap extends centrally through the plastics element, in the width direction.

According to a possible embodiment of the present disclosure the plastics element in each case comprises, in the hinge region(s), on both sides of the belt strap, at least one plastics region serving as a film hinge. This provides a particularly stable hinge region.

According to a possible embodiment of the present disclosure, the belt strap is not overmoulded in the hinge region. As a result, the flexibility of the belt strap in the hinge region is maintained. Furthermore, too great a thickness of the plastics element, which would prevent folding-down, is avoided.

According to a possible embodiment of the present disclosure, the belt strap extends, in the hinge region, in a recess in the plastics element between the plastics regions forming the film hinge.

According to a possible embodiment of the present disclosure, the plastics element comprises at least two or three regions, between which a hinge region is provided. As a result, the belt element is adjusted to its assigned task during fastening of the two components.

In particular, the plastics element can comprise exactly three regions, which are in connection with one another by hinge regions.

According to a possible embodiment of the present disclosure, a first region is arranged such that it is located in a position threaded through the at least one loop of the second component, when the component is fastened to the second component. This can be a central region, which is followed on both sides by hinge regions.

According to a possible embodiment of the present disclosure, a second region is provided, which serves for detachably fixing the belt element in the threaded-through position.

According to a possible embodiment of the present disclosure, the second region forms a free end of the plastics element and/or can be inserted into a pocket of the component.

According to a possible embodiment of the present disclosure, a third region is provided, in which the belt element is firmly connected, for example sewn, to the component.

According to a possible embodiment of the present disclosure, the width of the first region varies in an undulating manner.

According to a possible embodiment of the present disclosure, the wave bulg(es) are arranged where the belt element connects a loop of one component to a loop of the other component, in the threaded-through position.

According to a possible embodiment of the present disclosure, the plastics element comprises nub and/or bead elements extending transversely to the extension of the belt element, in the first region, on one or both main surfaces. Said elements can in particular extend on both sides of the wave bulges.

According to a possible embodiment of the present disclosure, the second region narrows in the direction towards the free end.

According to a possible embodiment of the present disclosure, the second region comprises a wider region which adjoins the hinge region, and a narrower region which forms the free end, wherein the wider and the narrower region are connected by a region in which the width reduces constantly towards the narrower region.

According to a possible embodiment of the present disclosure, the plastics element comprises at least one nub and/or bead element extending transversely to the extension of the belt element, in the second region, on one or both main surfaces. This can in particular be arranged in a narrower region that adjoins the hinge region.

According to a possible embodiment of the present disclosure, the plastics element is wider than the belt strap in the third region and comprises a web region extending transversely to the extension of the belt element. The web region is optionally used for sewing to the component.

The web region can surround the belt strap on three sides, in cross-section, while the fourth side of the belt strap extends flush with one side of the web region. As a result, the thickness of the web region is reduced.

According to a possible embodiment of the present disclosure, the plastics element comprises tabs, in the third region, which extend beyond the end of the belt strap, in the longitudinal direction, on both sides of the belt strap. These can also be sewn to the component.

According to a possible embodiment of the present disclosure, the plastics element is formed as a multi-component injection-moulded part. This makes it possible to in each case use a plastics material adjusted to the function of the region, for different regions of the plastics element.

According to a possible embodiment of the present disclosure, the plastics element comprises an outer structure of a hard plastics component, into which a soft plastics component is injected. In particular, in this case, lateral edges of the plastics element are formed by the hard plastics component.

According to a possible embodiment of the present disclosure, the soft plastics component forms an upper and/or lower face of the plastics element, at least in a portion of the plastics element. This improves the handling, and the friction with the loops and the component, which is important for the reliable connection, is increased.

According to a possible embodiment of the present disclosure, the soft plastics component comprises nub and/or bead elements extending transversely to the extension of the belt element.

According to a possible embodiment of the present disclosure, the hard plastics component surrounds the soft plastics component in a frame-like manner, and forms the side edges of the plastics element.

According to a possible embodiment of the present disclosure, the hard plastics component forms one or more film hinges. In particular, the above-described plastics regions forming the film hinges are formed by the hard plastics component. The web regions adjoining the plastics regions that form the film hinges are optionally also formed by the hard plastics component.

According to a possible embodiment of the present disclosure, the hard plastics component forms a region in which the belt element is rigidly connected, and in particular sewn, to the component.

According to a possible embodiment of the present disclosure, the belt strap extends over the entire length of the plastics element. This increases the stability of the belt element. Furthermore, this can be manufactured more simply, since the belt strap can be overmoulded in a clamped state.

According to a possible embodiment of the present disclosure, a free end of the belt strap protrudes beyond a free end of the plastics element. The free end of the plastics element can be pulled out of the pocket of the component again, via the free end of the belt strap, in order to release the connection.

According to a possible embodiment of the present disclosure, the free end of the belt strap is overmoulded with a second plastics element in an end region. This optionally forms a gripping region.

According to a possible embodiment of the present disclosure, the component comprises at least one loop, through which the free end of the belt element can be threaded, in order to connect the loop to the at least one loop of the second component.

As a result, the loops of the two components can be woven together by the belt element.

According to a possible embodiment of the present disclosure, at least one of the two components comprises at least two loops, which are spaced apart from one another such that a loop of the other component can be arranged therebetween, in order to weave together the three loops via the belt element.

In this case, the spacing of the two hinge regions relative to one another is optionally n-fold the width of the loops, wherein n may be an odd number, in particular 3 or 5. The belt element is therefore turned a first time before it passe through the first loop, and turned after it emerges from the last loop.

In one embodiment of the disclosure, the loop or loops extend(s) in a first direction, while the belt element is threaded through the loop or loops in the transverse direction. In this case, the transverse direction may extend perpendicularly to the first direction.

In particular, in a carrier system in which the present disclosure is used, the loops can extend horizontally, wherein the belt element is threaded through these vertically. However, if, within the context of the present application, reference is made, in this case, at another point to vertical and horizontal, this is initially intended to describe only the relative orientation of the loops and of the belt element with respect to one another, i.e. the first direction and the transverse direction. Only in one possible embodiment does this mean the absolute orientation of the loops or of the belt element in the actual carrying situation.

The loops can for example be provided by a belt strap which is sewn onto the components. Alternatively, the loops can also be provided by slits in a material layer of the components.

The free end of the plastics element can comprise a fastening region, in which it is connected to a fastening region of the component. For example, a press fastening can be arranged there.

Optionally, however, the free end of the plastics element is inserted into a pocket of the component, where it is fixed by friction with the pocket. The insertion optionally takes place in the direction towards the region in which the other end of the plastics element is rigidly connected to the component. The insertion optionally takes place from bottom to top.

The component according to the disclosure can be part of a standardised carrier system.

According to a possible embodiment of the present disclosure, the component is a PALS component for a MOLLE carrier system, as is used by the US army. In this case, the width of the loops and the spacing thereof are likewise standardised, just like the width of the belt element.

The present disclosure furthermore covers a method for producing a belt element for a component, as has been described above.

According to a possible embodiment of the present disclosure, the belt strap is clamped in an injection mould and overmoulded in the clamped state, in particular overmoulded with a hard component.

According to a possible embodiment of the present disclosure, the belt strap is clamped in the end regions thereof.

According to a possible embodiment of the present disclosure, said end regions are capped after the plastics element has been moulded on.

The present disclosure furthermore covers a belt element, as has already been described above in view of the component according to the disclosure, wherein the belt element comprises a textile belt strap and a plastics element, wherein the plastics element is moulded onto the belt strap.

According to a possible embodiment of the present disclosure, the belt element comprises two hinge regions which connect regions of the plastics element adjoining said hinge regions, and in which the belt strap can be turned.

According to a possible embodiment of the present disclosure, the plastics element comprises at least one plastics region that forms a film hinge.

The belt element can be designed in the manner as has already been described above.

The present disclosure further comprises a carrier system comprising a component according to the disclosure, as has been described above, and a second component, to which the component according to the disclosure can be detachably fastened via the belt element.

According to a possible embodiment of the present disclosure, the second component is a platform, in particular a vest, such as a bulletproof vest, a plates carrier, and/or a backpack.

According to a possible embodiment of the present disclosure, the component, as has been described above, is a transport element. In particular, the transport element can comprise a receiving chamber, in which one or more objects can be received, in order to be transported by means of the transport element. The receiving chamber can be closable and/or formed by a pocket of the transport element.

According to a possible embodiment of the present disclosure, the component is made of a textile material.

BRIEF DESCRIPTION OF THE DRAWINGS

The present disclosure will now be explained in greater detail with reference to an exemplary embodiment and drawings.

In the drawings.

DETAILED DESCRIPTION OF THE FIGURES

Figure 1:
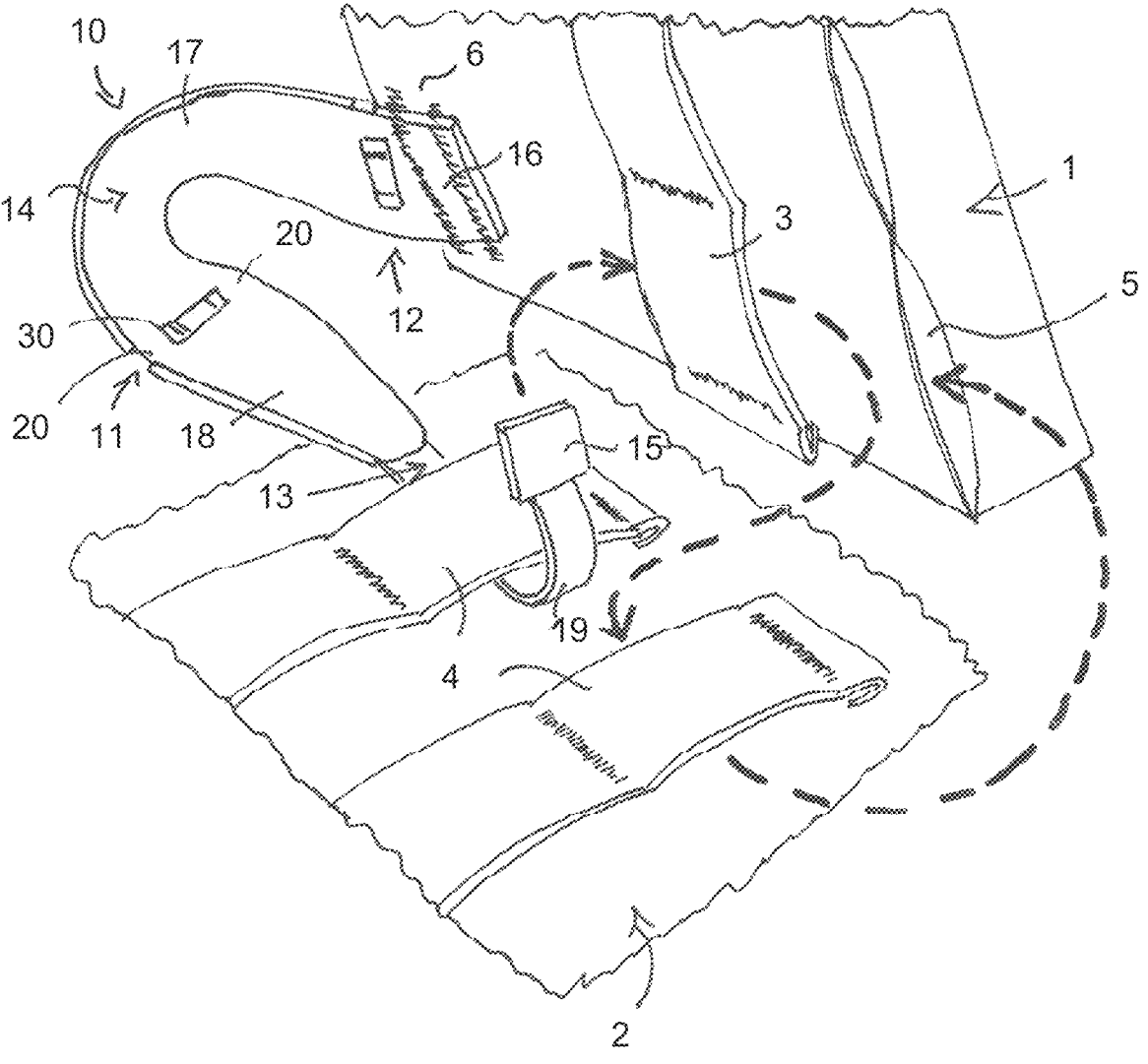
FIG. 1: shows an exemplary embodiment of a component according to the disclosure, which is fastened to a second component.

FIG. 1 shows an exemplary embodiment of a component 1 according to the disclosure which can be detachably fastened to a second component 2 via the belt element 10. The first component can for example be a bag, an ammunition carrier, and/or a weapons carrier; the second component can for example be a platform such as a vest, a plate carrier, a bag, or a backpack.

The belt element 10 is rigidly fastened by one end to the first component 1, and can be threaded, by its free end, through at least one loop 4, which is arranged on the second component 2, in order to fasten the first component to the second component. The first component 1 may also comprise at least one loop 3, through which the belt element is threaded.

In the exemplary embodiment, at least one of the two components comprises two loops 4 which are arranged in parallel with one another and/or side-by-side in the transverse direction and in particular vertically one above the other, which loops are spaced apart in such a way that a loop 3 of the other element can be arranged therebetween. In this case, the belt element is threaded through the three loops, in order to lace these together in the manner of a warp thread.

In the exemplary embodiment, the second component comprises at least two loops, and the component according to the disclosure comprises one loop. In a further embodiment, the second component comprises at least three loops which are arranged in parallel with one another and/or side-by-side in the transverse direction and in particular vertically one above the other, and the component according to the disclosure comprises at least two loops which are arranged in parallel with one another and/or side-by-side in the transverse direction and in particular vertically one above the other. Designs having a larger number of loops extending in parallel with one another and/or side-by-side in the transverse direction are also possible, wherein the component according to the disclosure comprises n loops, and the second component n+1 loops.

While a first end 16 of the belt element is firmly connected to the component 1, in particular sewn to the component 1, in a fastening region 6, a second end of the belt element comprises a fastening region 18 by means of which it can be detachably fastened to the first component after being threaded through the loops. In the exemplary embodiment, a pocket 5 is provided for this, into which the fastening region 18 can be inserted. In this case, the pocket extends from bottom to top in the direction towards the region 6 in which the belt element is firmly connected to the component.

Therefore, if the two components are fastened to one another via the belt element, the belt element is turned twice about 180°, specifically once immediately before it is threaded through the first loop of the second component, and once immediately after it leaves the last loop of the component or of the second component, and inserted into the pocket 5.

The at least one loop 3 is therefore positioned, in the transverse direction, in particular in the vertical direction, between the fastening region 6, in which the first end 16 of the belt element is firmly connected to the component, and the pocket 5, into which the fastening region 18 of the belt element is removably inserted.

In the exemplary embodiment, the loops are provided by belt straps which extend along the component in a first direction, in particular in the horizontal direction, and are sewn to the components by seams extending in the transverse direction, in particular in the vertical direction. Alternatively, the loops could also be provided by slits in a material layer of the respective components.

The belt element comprises a textile belt strap 13 and at least one plastics element 14, wherein the plastics element 14 is moulded onto the belt strap 13. As a result, the combination of the plastics element and belt strap can be produced in a cost-effective manner and at an unchanged level of quality, in large numbers. Compared with elements which are produced entirely from plastics material, improved handling ability result at a simultaneously increased stability, and an additional securing function.

In the exemplary embodiment, the belt element comprises two hinge regions 11 and 12, in which it can be turned about 180° in each case, as described above. In this case, the first hinge region 12 is arranged between the region 16 in which the belt element is rigidly connected to the component according to the disclosure, and the region 17 which, in the position in which the two components are fastened to one another, is threaded through the loops 4 and in particular weaves together the loops of the two components. The second hinge region 11 is arranged between the region 17 and the fastening region 18, by means of which the belt element is detachably connected to the component according to the disclosure.

In the exemplary embodiment, the component is designed such that it comprises a loop 3 which is arranged, in the transverse direction, in particular in the vertical direction, between two loops 4 of the second component. The spacing between the first hinge region 12, in which the belt element is turned about 180° for the first time, and the second hinge region 11, in which the belt element is turned about 180° for the second time, is therefore three loop widths.

Alternatively, the component according to the disclosure could also, for example, comprise two loops 3 which extend in parallel and are arranged side-by-side in the transverse direction and in particular vertically one above the other, and which are optionally weaved together with three loops of the second component. In this case, the spacing between the two hinge regions is five loop widths. Designs having a larger number of loops extending in parallel with one another are also possible, wherein in the case of a number of n loops on the component according to the disclosure, the spacing between the two hinge regions may be 2n+1.

In the exemplary embodiment, the hinge regions in each case interconnect two regions, in which the belt element is formed by the belt strap and the plastics element.

In a first embodiment, which is not shown in the drawings, the plastics element comprises three mutually separated regions 16, 17 and 18, which are interconnected, in the hinge regions 11 and 12, only by the continuous belt strap.

However, in the exemplary embodiment, the plastics element 14 is a continuous element which extends non-stop over the regions 16, 17 and 18, wherein the plastics element is designed, in the hinge regions, as a film hinge. In particular it comprises three plastics regions, in each case, in the hinge regions, which plastics regions are formed so as to be thinner than the remaining regions and therefore form a film hinge.

In the exemplary embodiment, the plastics element 14 is wider than the belt strap 13, wherein plastics regions 20, serving as a film hinge, are provided in each case on both sides of the belt strap 13, in the hinge regions.

In the exemplary embodiment, the belt strap is not over-moulded in the hinge region. The non-overmoulded region 21 of the belt strap extends in a recess 30 in the plastics element, between the plastics regions 20 serving as the film hinge.

The belt strap 13 extends beyond the fastening region 18 of the belt element, and is not overmoulded in this region 19. The belt tab formed thereby serves to make it possible to pull the fastening region 18 out of the pocket 5 again. Therefore, upon insertion of the fastening region 18 into the tab at the end of the plastics element, the belt strap 13 is turned, and is inserted into the pocket in this turned position, such that the free end of the belt strap shows out of the pocket 5. In the exemplary embodiment, a second plastics element 15 is moulded onto said free end of the belt strap, which plastics element serves as a gripping region for threading the belt element through the loops, and serves for pulling the fastening region out of the pocket 5.

In the fastening region 18, the plastics element 14 optionally tapers towards the free end thereof, in order to facilitate threading through the loops and insertion into the pocket.

The component according to the disclosure can in particular be a PALS component for a MOLLE carrier system.

In this case, in particular the spacings and widths of the loops 3 and 4, and the width of the belt element 10 are standardised, such that a very wide range of components can be arranged on a second component. In this case, the second component typically comprises a larger number of loop rows arranged side-by-side in the transverse direction and in particular vertically one above the other, in order to be able to arrange different components according to the disclosure thereon, in different positions.

An exemplary embodiment of a belt element which can be used according to the disclosure is now described in greater detail with reference to FIGS. 2-5. In this case, it initially has the basic structure as has already been explained in greater detail above, in view of FIG. 1, for the belt element. In this case, it in particular comprises a belt strap 13 on which a plastics element 14 is moulded.

In the exemplary embodiment shown in FIGS. 2 to 5, the textile belt strap 13 extends over the entire length of the belt element. This facilitates the production, since the belt element can be clamped in the injection mould in which it is overmoulded. In particular, in this case the outer ends of the belt strap can be clamped, and then the belt strap can be overmoulded in a region located further inwards. The ends used for clamping can then be capped. Further details regarding the production method are explained further in the following with reference to FIGS. 6 and 7.

The plastics element 14, with which the belt strap 13 is overmoulded, comprises, as described above, three regions 16, 17 and 18, between which the hinge regions 12 and 11 are arranged.

In the region 16, the belt element is firmly connected, in particular sewn, to the component. For this purpose, the plastics element comprises a web region 29 in which the plastics element extends over the entire width of the belt element and surrounds the belt strap in a central region, at least in part.

Figure 4:
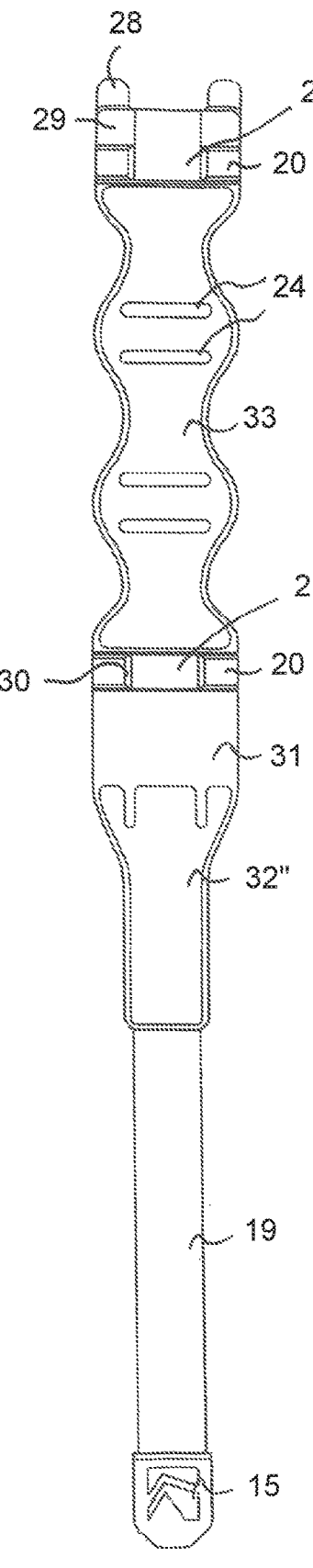
Figure 5:
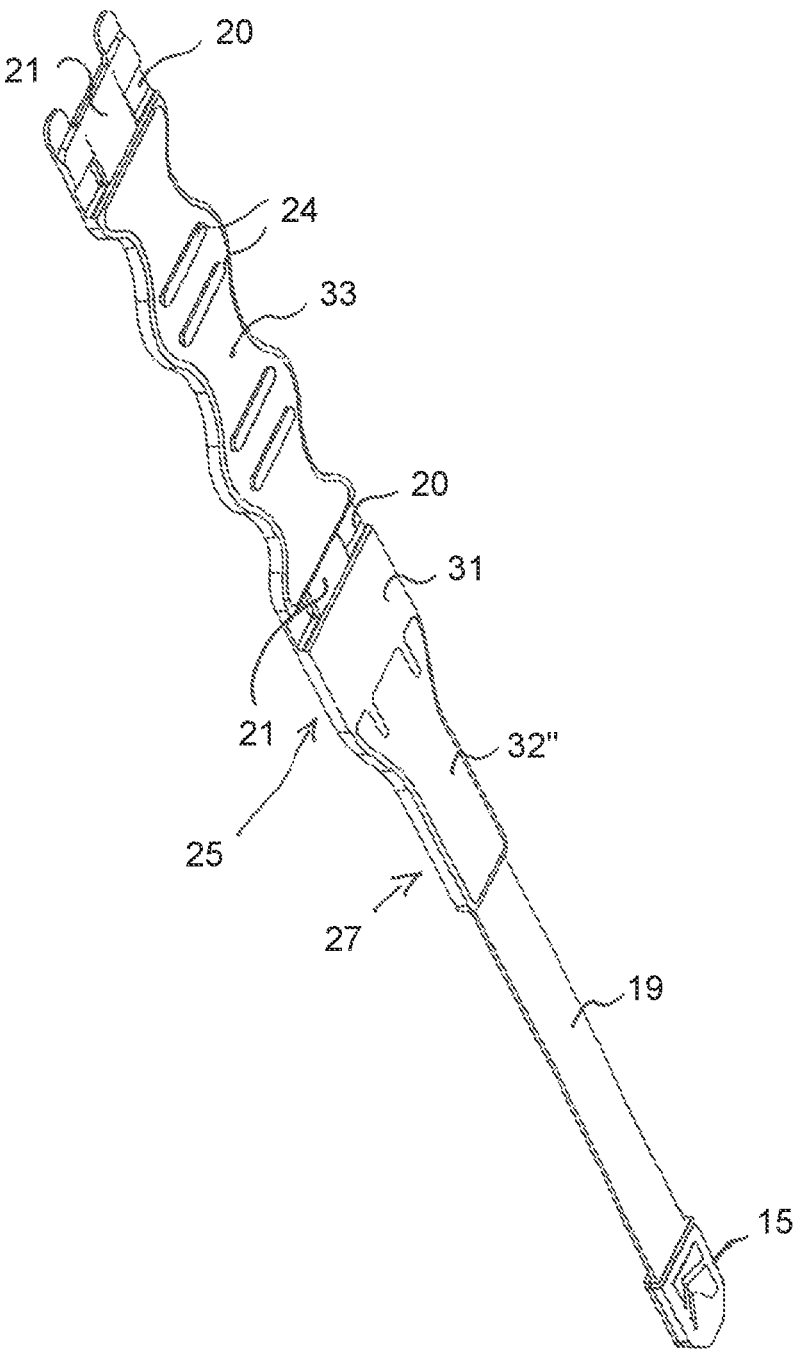

In the exemplary embodiment, in the region of the web 29 the belt strap is overmoulded merely on a first of the two main surfaces, while the belt element extends flush with the lateral elements of the web on the opposing second side shown in FIGS. 4 and 5, and therefore is overmoulded at most by small amounts of plastics material intruding at the side. As a result, the thickness of the web region is reduced, which simplifies the sewing. Therefore, in the web region 29 the belt strap is overmoulded merely on three sides, in cross-section.

Furthermore, lateral tabs 28 of the plastics element are provided here, which protrude beyond the centrally arranged end of the belt strap in the longitudinal direction, and in which the plastics element can be once again sewn separately to the component.

In a first variant, the belt element can be placed on the component by the region 16, and sewn thus to said component. In this case, the two tabs are used to secure the region 16 to the component by a second seam. In a second variant, the belt element can be placed between two layers of the component, and thus be sewn to these. In the case of an interposed connection of this kind, the seam in the region of the web 29 is sufficient.

In the region 17 which weaves the loops together, the plastics element has an undulating shape of its outer contour. In this case, the wave bulges 22, in which the width of the plastics element is greatest, and wave troughs 23, in which the width is smallest, alternate.

The wave bulges 22 are arranged where, in the fastening state, the belt element emerges from one loop in enters the next loop. The full width in this region improves the fastening between the loops.

Furthermore, bead regions 24 extending transversely to the extension of the belt element are provided on both sides of the wave bulge 22, which bead regions ensure increased friction and thus more reliable fastening to the loops.

The transversely extending beads 24 are arranged on both main surfaces of the belt element.

In the third region 18, which is inserted into the pocket 5, the plastics element has a shape which narrows proceeding from the hinge region 11. In this case, in the specific exemplary embodiment, a first wider region 25 is provided, which adjoins the hinge region 11, and a second narrower region 27 is provided, which forms the free end, wherein the first and the second region are connected by a transition region 26 in which the width gradually decreases.

As can be seen in particular from FIG. 5, the regions 20, which form a film hinge, in each case form regions of the plastics element which are of a greater thickness than the regions 20. In this case, the length of the regions 20 is selected such that the belt element can be deflected, here, about 180 degrees, and the regions of the plastics element connected by the hinge regions can be laid one on top of the other.

Figure 2:
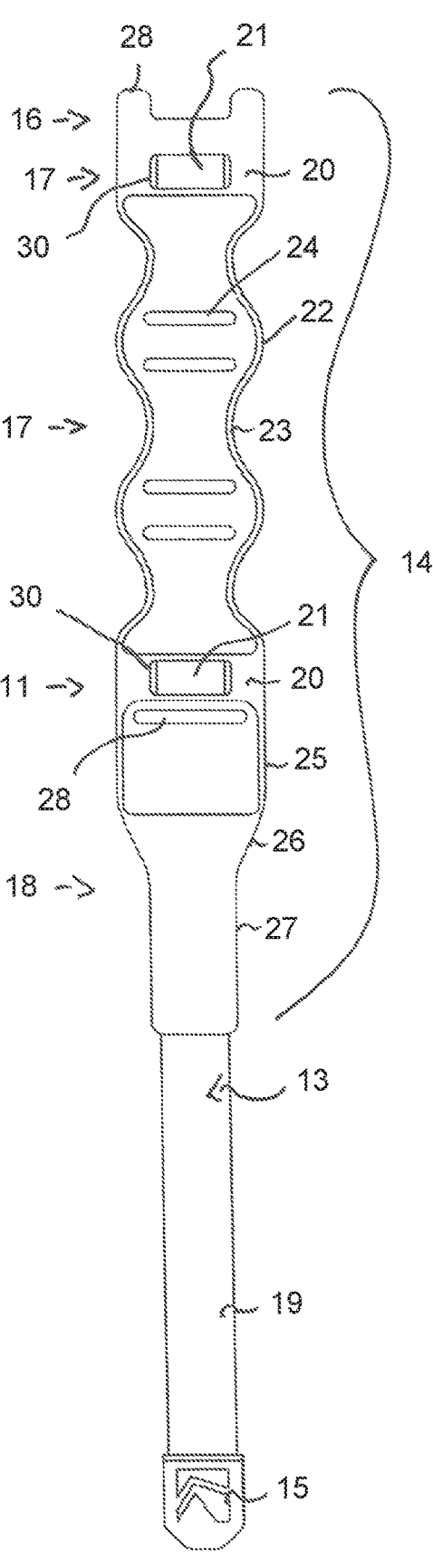
FIG. 2: shows an exemplary embodiment of a belt element according to the disclosure, in a view from a first side.
Figure 3:
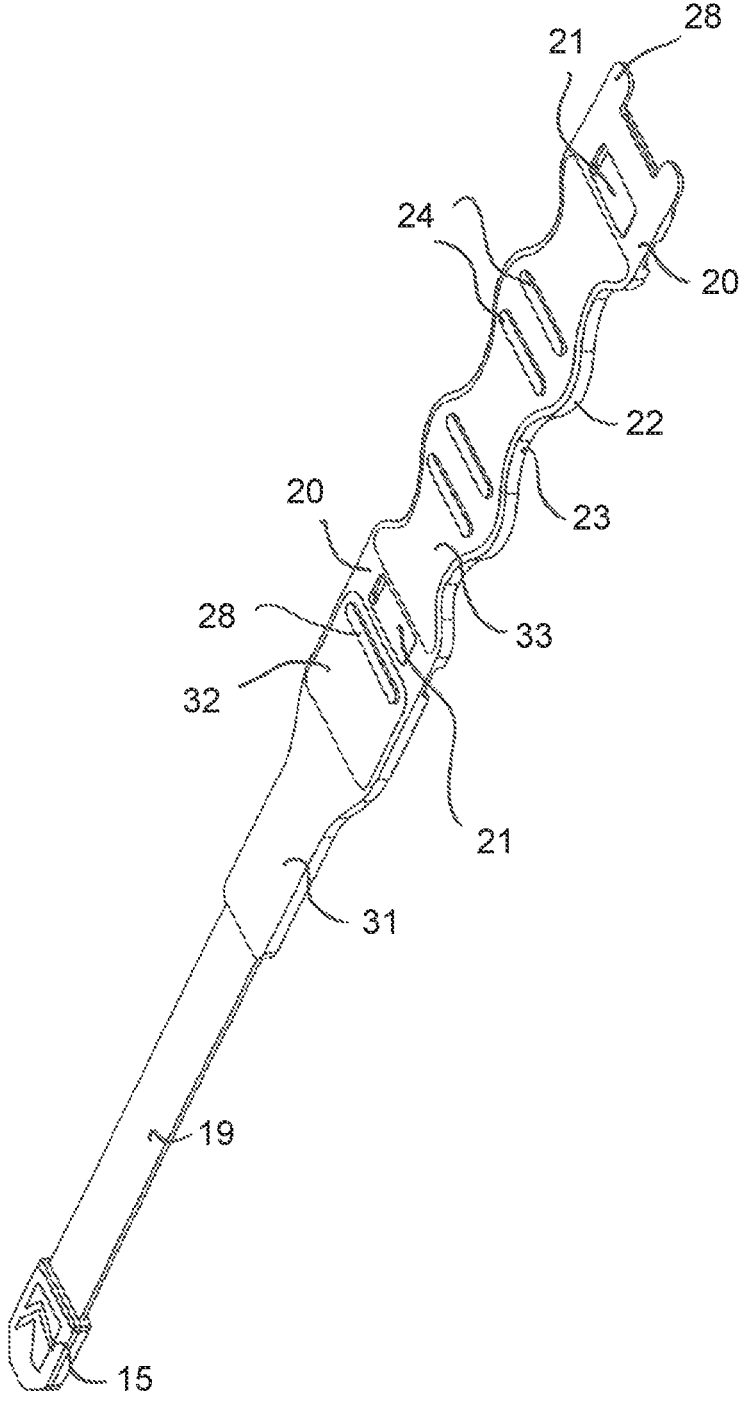
FIG. 3: is a perspective view showing the first side shown in FIG. 2, FIG. 4: is a plan view from a second side of the exemplary embodiment of a belt element according to the disclosure shown in FIGS. 1 and 2, FIG. 5: is a perspective view of the belt element according to the disclosure, showing the second side shown in FIG. 4, FIG. 6: is a perspective view of the belt element according to the disclosure in an intermediate stage of the production process, in which only the hard components of the plastics element were moulded, showing the first side shown in FIGS. 2 and 3.

As can be seen in particular from FIG. 3, a first side of the regions 20 forming the film hinge extends flush with the first main surface of the belt element, shown for example in FIG. 2. In contrast, on the second main surface shown in FIGS. 4 and 5 the plastics element is provided in the region 20 with recesses, by which the thickness of the plastics element is correspondingly reduced in the recess of the film hinge.

In this case, in the exemplary embodiment the second main surface is the surface which rests on the component in the region 16. The belt element is therefore turned such that in each case regions of the first main surface are folded onto one another.

The plastics element 14 is manufactured as a two-component injection-moulded part. For this purpose, firstly a hard plastics component is moulded onto the belt strap. The intermediate product thus produces is then inserted into a second injection mould, in order to mould on the soft plastics component.

As already described above, for this purpose the belt strap 13 is clamped in the first injection mould, in order to mould on the hard plastics component. Clamping in the second injection mould is no longer essential, because the belt strap is already fixed by the hard plastics component.

Figure 6:
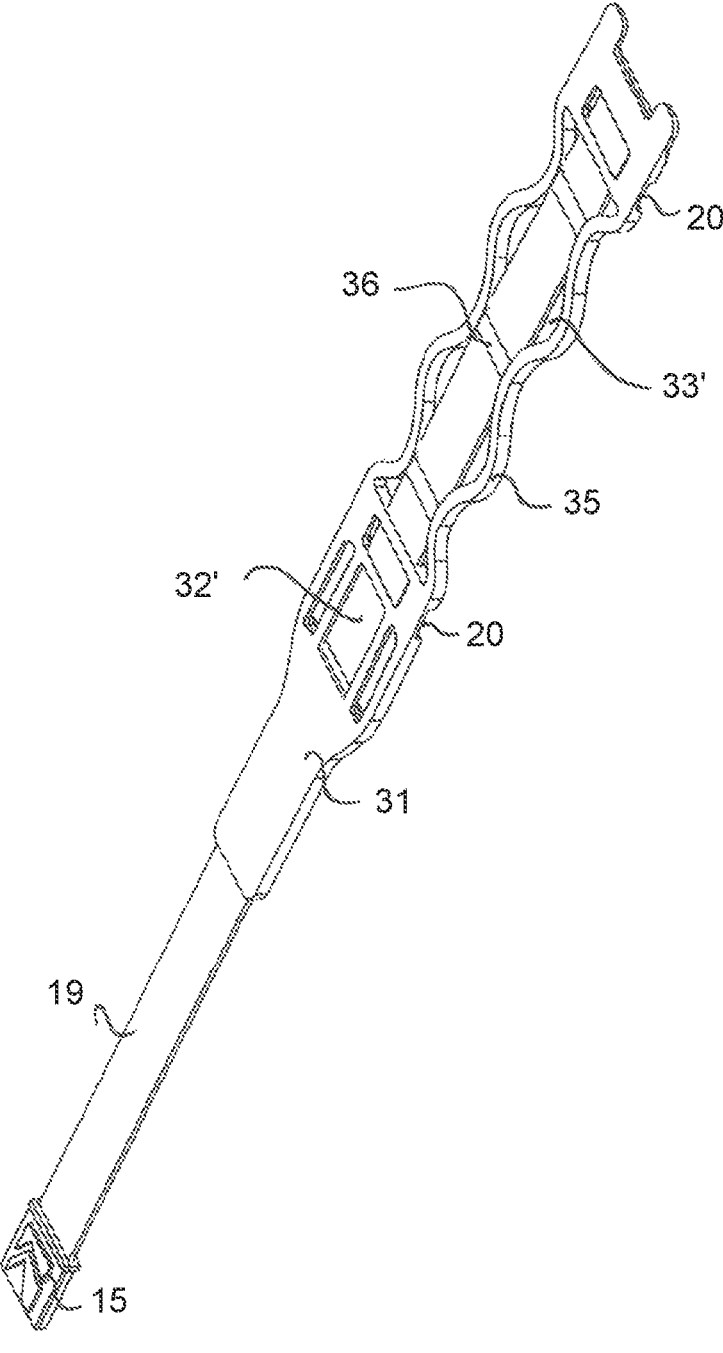
Figure 7:
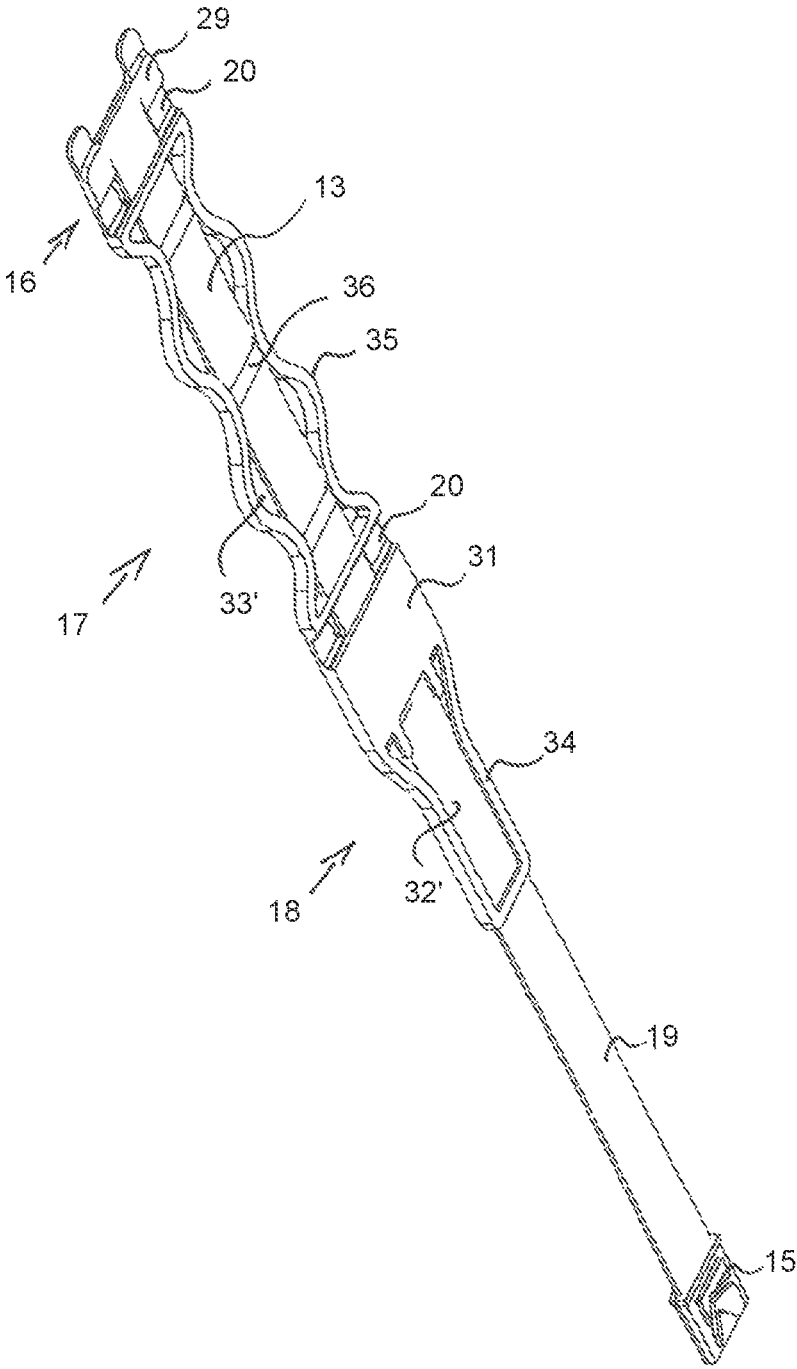
FIG. 7 is a perspective view of the belt element according to the disclosure in the intermediate stage of the production process also shown in FIG. 6, showing the second side shown in FIGS. 4 and 5.

The belt strap comprising the moulded-on hard plastics component is shown in FIGS. 6 and 7.

The regions 20, which form the film hinges, are provided by the hard plastics components, as are web regions which are adjacent thereto and extend over the entire width of the plastics elements.

In those regions of the hinge regions in which the belt strap extends, which strap is not overmoulded there, the hard component comprises a recess 30 in each case.

The region 16 is also formed by the hard plastics component.

In the region 17, the hard plastics component forms a frame, into which the soft plastics component is injected. In particular in this case the lateral delimitation 35 is formed by the hard plastics component. Furthermore, web elements 36, in which the belt strap is overmoulded by the hard plastics component, are provided in the region of the wave troughs. In contrast, in the remaining regions 33' the belt strap is free, and is then overmoulded by the soft plastics component.

As can be seen in FIGS. 2-5, in the region 17 the soft plastics component 33 forms the two main surfaces of the belt element. The bead elements 24 are also formed by the soft plastics component.

In the region 18, the hard plastics component in each case comprises recesses 32', which are ejected together with the soft plastics component 32. Here, too, the hard plastics component surrounds the soft plastics component in a frame-like manner, and forms the lateral delimitations of the plastics element. In contrast, the bead element 28 is formed by the soft component.

In the first region 25, adjoining the hinge region, the soft plastics element 32 is provided only on the first main surface, while the opposite main surface 31 is formed by the hard plastics element. In contrast, in the second, narrower region 27 and in the transition region, the soft plastics element 31" is arranged on the second main surface, while the opposite main surface 31 is formed by the hard plastics element. The belt strap is exposed in the respective recesses 32' for the two soft plastics components, and is thus overmoulded by the hard plastics component on three sides. The fourth side is overmoulded by the soft plastics component.

The soft plastics components increase the grip of the belt element during handling. However, the decisive function of the soft plastics components is the increase friction of the belt element on the loops or the pocket of the component. This increased friction prevents the belt element from moving out of its fastening position and the connection being released. Accordingly, the soft plastics components are arranged where increased friction is required, wherein the friction is optionally further increased by the bead elements.

The strap for pulling the free end 18 of the plastics element out of the pocket is provided by the region 19 of the belt strap which is guided out of the plastics element and is not overmoulded. The region 19 of the belt strap comprises, at its free end, a gripping element designed as a plastics element 15, which gripping element, in the exemplary embodiment, is produced at least in part from hard plastics material, and the hard plastics component of which is manufactured, together with the hard plastics component of the plastics element 14, in the first injection mould. In the exemplary embodiment, the hard plastics component of the plastics element 15 comprises recesses, which are then filled, in the second injection mould, with the soft component, together with the soft plastics component of the plastics element 14.

All conventional materials can be used for the belt strap, the hard plastics component and the soft plastics component.

The invention claimed is:

1. Component of a carrier system, comprising: a belt element which is fastened to the component by a first end and comprises a second free end, wherein the belt element can be threaded through at least one loop of a second component by means of the second free end, in order to fasten the components to one another, wherein the belt element comprises a textile belt strap and a plastics element, wherein the plastics element is molded onto the textile belt strap, and wherein the belt element comprises at least one hinge region, which connects a first region and a second region of the plastics element adjoining said hinge region, the first region and the second region of the plastics element molded onto the textile belt strap, wherein the plastics element comprises at least one third plastics region which connects the first and second regions of the plastics element across the hinge region and forms a film hinge in the hinge region configured to be folded over, and wherein the first and second regions of the plastics element have a greater material thickness than the at least one third plastics region forming the film hinge, and wherein the textile belt strap is overmolded by the plastics element in the first and second regions of greater material thickness.

2. Component according to claim 1, wherein the textile belt strap connects the first and second regions of the plastics element across the hinge region and is configured to be folded over in the hinge region.

3. Component according to claim 2, wherein the plastics element comprises two third plastics regions each extending on one side of the textile belt strap in the hinge region, wherein the textile belt strap is not overmolded in the hinge region and extends in a recess in the plastics element between the two third plastics regions.

4. Component of a carrier system comprising: a belt element which is fastened to the component by a first end and comprises a second free end, wherein the belt element can be threaded through at least one loop of a second component by means of the second free end, in order to fasten the components to one another, wherein the belt element comprises a textile belt strap and a plastics element, wherein the plastics element is molded onto the textile belt strap, wherein the belt element comprises at least a first and a second hinge region, which connect a first, second and third region of the plastics element adjoining said first and second hinge regions, wherein the plastics element comprises fourth plastics regions which connect the first, second and third region of the plastics element across the first and second hinge region and respectively form a first and second film hinge in the first and second hinge region configured to be folded over, wherein the first, second and third region of the plastics element have a greater material thickness than the fourth plastics regions forming the first and second film hinge, and wherein the textile belt strap is overmolded by the plastics element at least in the first and third plastics region of greater material thickness.

5. Component according to claim 4, wherein the first region is arranged such that it is located in a position threaded through the at least one loop of the second component, when the component is fastened to the second component, and the second region forms a free end of the plastics element, for detachably fixing the belt element in the position, and wherein the belt element is fixedly connected to the component in the third region out of the at least three regions.

6. Component of a carrier system, comprising:
a belt element which is fastened to the component by a first end and comprises a second free end, wherein the belt element can be threaded through at least one loop of a second component via the second free end, in order to fasten the components to one another, wherein the belt element comprises a textile belt strap and a plastics element,
wherein
the plastics element is molded onto the textile belt strap, wherein the plastics element is designed as a multi-component injection-moulded part, wherein the plastics element comprises an outer structure consisting of a hard plastics component into which a soft plastics component is injected, wherein the hard plastics component surrounds the soft plastics component in a frame-like manner and forms lateral edges of the plastics element.

7. Component according to claim 6, wherein the soft plastics component forms an upper and/or lower face of the plastics element, at least in a portion of the plastics element, and/or comprises nub and/or bead elements extending transversely to an extension of the belt element.

8. Component according to either claim 6, wherein the hard plastics component forms one or more film hinges and/or a region in which the belt element is connected to the component.

9. Component according to claim 1, wherein the textile belt strap extends over the entire length of the plastics element.

10. Component according to claim 1, wherein a free end of the textile belt strap protrudes beyond a free end of the plastics element, wherein the free end of the textile belt strap is overmolded with a second plastics element.

11. Component according to claim 1, wherein the component comprises at least one loop, through which the free end of the belt element can be threaded, in order to connect the loop to the at least one loop of the second component.

12. Belt element configured to be fastened to a component by a first end and comprising a second free end, wherein the belt element comprises a textile belt strap and a plastics element, wherein the plastics element is molded onto the belt strap, wherein the belt element comprises at least one hinge region, which connects a first and a second region of the plastics element adjoining said hinge region, the first region and the second region of the plastics element molded onto the textile belt strap, wherein the plastics element comprises at least one third plastics region which connects the first region and the second region of the plastics element across the hinge region and that forms a film hinge in the hinge region configured to be folded over, and wherein the first and second regions of the plastics element have a greater material thickness than the at least one third plastics region forming the film hinge, and wherein the textile belt strap is overmolded by the plastics element in the first and second plastics regions of greater material thickness.

13. Carrier system comprising a first component according to claim 1 and a second component to which the first component can be detachably fastened via the belt element.

14. Carrier system according to claim 13, wherein the second component is a vest, a plate carrier and/or a backpack, and/or wherein the first component is a transport element which is produced from textile material.

15. Belt element according to claim 12, wherein the textile belt strap connects the first and second regions of the plastics element across the hinge region and is configured to be folded over in the hinge region.

16. Belt element according to claim 15, wherein the plastics element comprises two third plastics regions each extending on one side of the textile belt strap in the hinge region, wherein the textile belt strap is not overmolded in the hinge region and extends in a recess in the plastics element between the two third plastics regions.

* * * * *